United States Patent [19]

Schmidt et al.

[11] 3,930,119

[45] Dec. 30, 1975

[54] FACSIMILE APPARATUS FOR WRITING AND READING MECHANICALLY MOVING DOCUMENTS

[75] Inventors: Rolf Schmidt, Rott; Klaus Carl, Aachen, both of Germany; Pol Ambroise Ghislain Joseph Gustin; Raymond Georges Schayes, both of Brussels, Belgium

[73] Assignee: U.S. Philips Corporation, New York, N.Y.

[22] Filed: Sept. 20, 1974

[21] Appl. No.: 507,794

[52] U.S. Cl. ............... 178/7.6; 178/7.7; 178/7.3 D; 178/7.1; 178/DIG. 27; 340/173 LM; 340/173.2; 350/160 R; 350/162

[51] Int. Cl.[2] .......................................... H04N 1/24

[58] Field of Search .............. 178/DIG. 27, 7.7, 7.6, 178/7.3 D, 7.1; 340/173 LM, 173.2; 350/160 R, 162

[56] References Cited

UNITED STATES PATENTS 3,826,865 2/1974 Quate et al. ......................... 178/7.1

*Primary Examiner*—Benedict V. Safourek
*Assistant Examiner*—Edward L. Coles
*Attorney, Agent, or Firm*—Frank R. Trifari; Henry I. Steckler

[57] ABSTRACT

The invention relates to a facsimile apparatus using positionally controllable light beams for writing and reading information on mechanically moving documents. The apparatus comprises an electronically controllable switching mask plate which is made of a material containing mixed crystals of lead zirconate and lead titanate, doped with lanthanum is disposed between polarisation filters, and is provided with a row of electrodes to which voltages may selectively be applied. The light which is controlled by the mask plate scans the document.

10 Claims, 4 Drawing Figures

FACSIMILE APPARATUS FOR WRITING AND READING MECHANICALLY MOVING DOCUMENTS

The invention relates to a facsimile apparatus using positionally controllable light beams for writing and reading information on mechanically moving documents.

For facsimile transmission the picture to be transmitted is resolved into picture elements. Satisfactory reproduction is obtained at a resolution of only 4 elements per mm, i.e. a page of size DIN A4 (= ISO-A4) may be resolved in about one million of picture elements in the form of an array of 1,200 lines of 800 picture elements each. In the simplest case, at the transmitter end each successive line of the original picture is serially scanned, element by element, whilst simultaneously at the receiver end a copy is produced, element by element. Commercially available apparatus scans the original picture, which is wrapped around a drum, line by line according to a helix and simultaneously produce a copy on a drum according to a helix. The exact mechanical movement in two co-ordinate directions limits the transmission speed. In other methods the line movement is effected in one coordinate direction only by a mechanical feed device, each line being opto-electrically scanned. In such a method the copy may, for example, be printed also by means of light on a photo-sensitive substrate (for example an electrophotographic layer). Point scanning is performed by means of a rotary mirror or a cathode-ray tube and a suitable optical system. In addition, integrated arrays of aligned photo-sensitive elements (up to several hundreds of elements) and of aligned photo-emissive diodes (up to several hundreds of diodes) are known by means of which, when combined with a suitable optical system, both serial and parallel scanning and printing can be effected.

Also, electronically controllable switching masks (page composers) are known which in the manner of a photographic shutter pass desired light beams of a source which illuminates the masks. Owing to the properties of the materials hitherto used the said switching masks do not operate satisfactorily when rapid changes between blocking and transmitting conditions are required.

It is an object of the present invention to provide a facsimile apparatus for writing and reading which uses direct light beams at high deflection speeds.

According to the invention an electronically controllable switch mask plate, disposed between polarisation filters and consisting of a material containing mixed crystals of lead zirconate and lead titanate, and doped with lanthanum, is provided with aligned electrodes, to which voltages may selectively be applied so that the light which is controlled by the mask plate scans the document.

Embodiments of the invention will now be described, by way of example, with reference to the accompanying diagrammatic drawings, in which.

Figure 1:
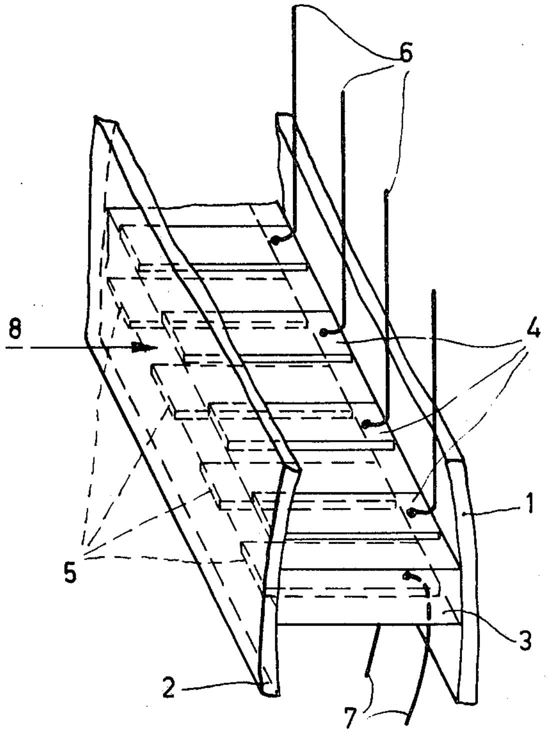
FIG. 1 shows an arrangement having oppositely disposed rows of electrodes.

The light from a normal lamp is resolved in several hundreds of aligned light spots which can be switched on or off individually, serially or in groups, solely by applying or removing electric voltages. For this purpose a large number of electrodes are arranged in line with one another. In the embodiment shown in FIG. 1 a plate 3 made of a ceramic material containing lead zirconate and lead titanate doped with lanthanum and provided with electrodes 4 and 5 and associated electric connections 6 and 7 respectively is disposed between two polarisation filters 1 and 2. The material of plate 3 has the property of field-induced ferro-electricity (quasiferro-electric behaviour), the information being stored for quasi-static periods by disconnecting the electrodes from a signal source with continuous signal voltage, whilst the stored information can be erased by short-circuiting appropriate electrodes. A particularly advantageous material is described in U.S. patent application Ser. No. 561,415, filed Mar. 24, 1975, which is a continuation of application Ser. No. 374,659, filed June 28, 1973 now abandoned.

The electrodes are so disposed in two long rows that each pair of opposed electrodes form a picture element. The light is incident into the arrangement in a direction parallel to the major electrode faces (arrow 8). Alternatively all the electrodes 4 or all the electrodes 5 on one surface of the plate may be combined to form a single common counter electrode. If now an electric voltage is applied between two opposed electrodes, the electro-optical effect is produced in the ceramic material of the plate 3 in the aforementioned manner. Whereas before the arrangement did not transmit light with the polarisation filters 1 and 2 crossed, now it will transmit light in the region in which the electric field is produced. Measurements performed on single elements have shown that light dark ratios of 1000:1 are obtainable.

Figure 2:
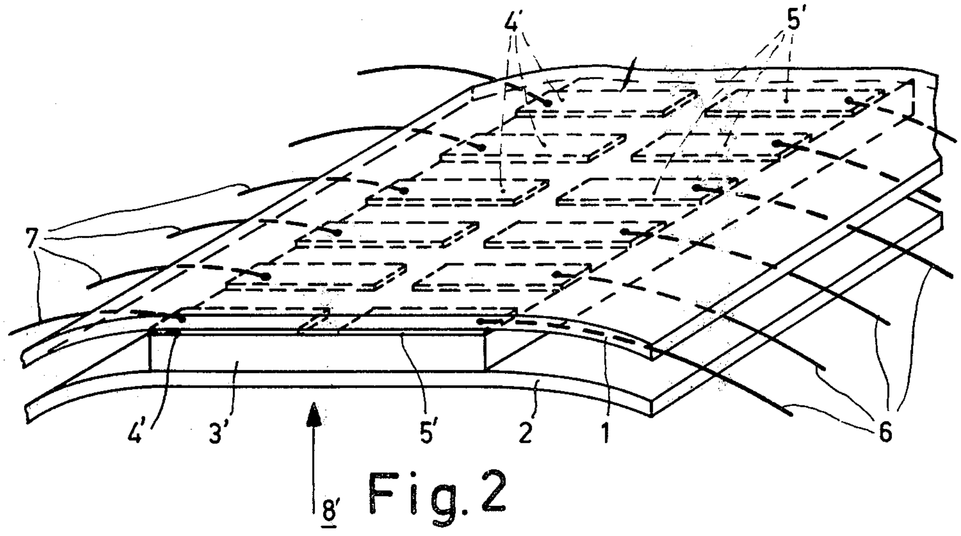
FIG. 2 shows an arrangement having juxtaposed rows of electrodes.

As is shown in FIG. 2, all the electrodes 4′ and 5′ may be disposed on the same major face of the ceramic plate 3′, the light being incident in a direction at right angles to the major surfaces of the electrodes as indicated by the arrow 8′. If required, a plurality of ceramic plates provided with electrodes may be stacked so that light beams can be masked according to a raster between the electrodes of the individual plates. This requires a more elaborate design of the signal generator for controlling the electrode, however, this does not provide difficulty, so that in this arrangement light spots are simultaneously available, permitting the recording speed for the individual symbols to be further increased.

In a facsimile apparatus combined with transmitting and receiving equipment the same arrangement may alternately be used for transmission and reception and for writing and reading respectively.

Figure 3:
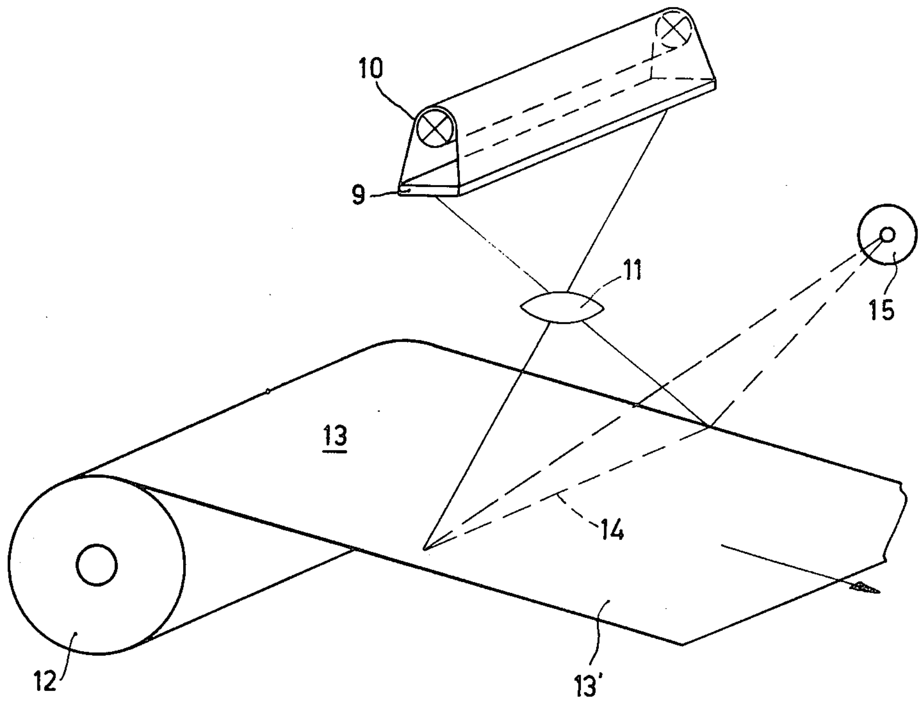
FIG. 3 shows schematically the construction of an embodiment of a facsimile apparatus.
Figure 4:
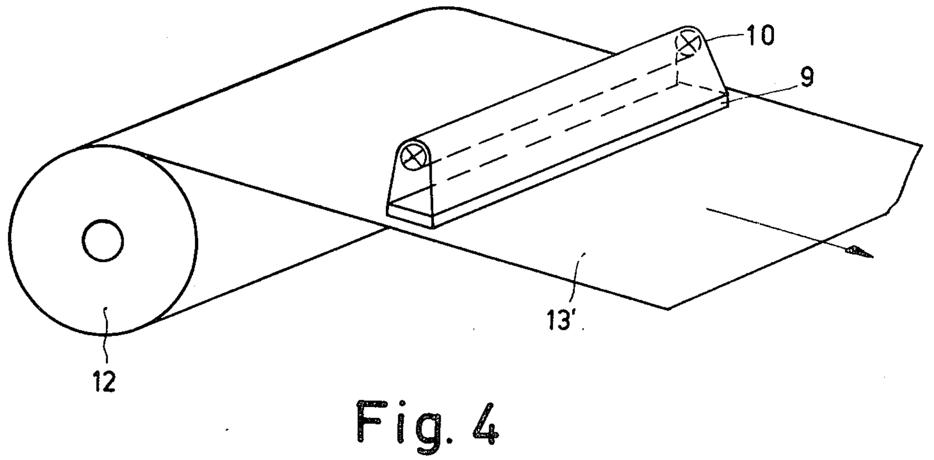
FIG. 4 shows a modification of the apparatus of FIG. 3.

In the embodiment shown in FIG. 3 the arrangement 9, which comprises the ceramic plate 3 with the electrodes 4 and 5 and the polarisation filters 1 and 2, is illuminated by a lamp 10. When an electric voltage is applied to the electrodes in accordance with a picture element a light spot is produced, an image of which is formed by means of an optical system 11 on a photosensitive substrate 13 (for example photographic paper, electrophotographic layer) adapted to be moved by means of a feed device 12. When the picture elements of the arrangement 9 are spaced from one another by a distance required for the desired resolution, an optical system may in some cases be dispensed with (FIG. 4). When the electrodes are serially controlled and the picture elements are serially scanned a line 14 composed of dots is produced on the photo-sensitive substrate 13, and when the dots which are to appear as bright or dark are selected in accordance with the facsimile signal being received and the substrate is simultaneously moved, the picture to be transmitted will be recorded. The storage effect mentioned hereinbefore can be advantageously utilised in this use also. Furthermore, according to the fact whether information being received with respect to a black picture dot causes a voltage to be applied to the electrodes of a picture element or causes them to be short-circuited, either positive or negative picture recordings may be achieved in a simple manner.

The same arrangement may be used for reading. In this case, instead of the photosensitive substrate a picture 13' to be transmitted is moved at a constant speed. The picture elements of the arrangement 9 are consecutively opened for short periods. Thus the impression of a travelling light spot is produced in the picture 13' to be transmitted and the diffuse reflection of this spot can be measured, for example by means of a photocell 15, possibly with the interposition of a cylindrical lens.

Alternatively the lamp 10 and the photocell 15 may be interchanged. In this case the picture 13' will be continuously illuminated whilst the photocell sees the diffuse reflection of only a small area of the picture. In this arrangement also a suitable optical system may be inserted before the photo-electric cell.

What is claimed is:

1. Facsimile apparatus using positionally controllable light beams for writing and reading information on mechanically moving documents, said apparatus comprising a pair of polarization filters, an electronically controllable switching mask plate having two major faces and consisting of mixed crystals of lead zirconate and lead titanate doped with lanthanum, said plate being disposed between said polarisation filters, a plurality of aligned electrodes disposed in rows on said plate and means for selectively applying voltage to said electrodes, whereby the light which is controlled by the mask plate scans the document to be read or written.

2. Facsimile apparatus as claimed in claim 1, wherein said electrodes are oppositely disposed on the two major faces of the switching mask plate, the light being incident through the opposed rows of electrodes.

3. Facsimile apparatus as claimed in claim 1, wherein said rows of electrodes are disposed side by side on one major face of the switching mask plate, the light being incident between the rows of electrodes.

4. Facsimile apparatus as claimed in claim 1, wherein one row of electrodes comprises a continuous electrode.

5. Facsimile apparatus as claimed in claim 1, comprising a plurality of switching mask plates arranged in a stack, to form a raster of controllable light beams.

6. Facsimile apparatus as claimed in claim 1, wherein said switching mask plate has a line raster, and further comprising a source of light of corresponding size, and optical system means for projecting the light spots produced onto the document.

7. Facsimile apparatus as claimed in claim 1, wherein the source of light and the switching mask plate are disposed in close proximity above the document.

8. Facsimile apparatus as claimed in claim 1, wherein the mask produces a single light spot which travels along a line and photosensitive element means for detecting the reflection of said light spot from said document.

9. Facsimile apparatus as claimed in claim 8, wherein the positions of the photosensitive element and the source of light are interchanged.

10. Facsimile apparatus as claimed in claim 8 wherein said photosensitive element means comprises a photoelectric cell.

* * * * *